(12) United States Patent
Cedronius et al.

(10) Patent No.: US 11,949,512 B2
(45) Date of Patent: Apr. 2, 2024

(54) RETRANSMISSION OF DATA IN PACKET NETWORKS

(71) Applicant: Livestreaming Sweden AB, Solna (SE)

(72) Inventors: Anders Cedronius, Alvsjo (SE); Hans Insulander, Sollentuna (SE); Christer Bohm, Nacka (SE); Per Lindgren, Strangnas (SE)

(73) Assignee: Livestreaming Sweden AB, Solna (SE)

( * ) Notice: Subject to any disclaimer, the term of this patent is extended or adjusted under 35 U.S.C. 154(b) by 688 days.

(21) Appl. No.: 16/078,365

(22) PCT Filed: Feb. 24, 2017

(86) PCT No.: PCT/EP2017/054288
§ 371 (c)(1),
(2) Date: Aug. 21, 2018

(87) PCT Pub. No.: WO2017/144643
PCT Pub. Date: Aug. 31, 2017

(65) Prior Publication Data
US 2021/0194635 A1   Jun. 24, 2021

(30) Foreign Application Priority Data
Feb. 26, 2016 (SE) .................................... 1650253-6

(51) Int. Cl.
*H04L 1/18* (2023.01)
*H04L 1/1809* (2023.01)
(Continued)

(52) U.S. Cl.
CPC .......... *H04L 1/1809* (2013.01); *H04L 1/1877* (2013.01); *H04L 1/1887* (2013.01); *H04L 43/0829* (2013.01); *H04L 43/0852* (2013.01)

(58) Field of Classification Search
None
See application file for complete search history.

(56) References Cited

U.S. PATENT DOCUMENTS 5,548,796 A * 8/1996 Ketchum ............ H04L 47/6215
370/447
5,918,002 A * 6/1999 Klemets .................. H04L 65/80
714/18

(Continued)

FOREIGN PATENT DOCUMENTS

EP          1020052 A1    7/2000

OTHER PUBLICATIONS

International Search Report PCT/ISA/210 for International Application No. PCT/EP2017/054288 dated Apr. 11, 2017.

*Primary Examiner* — Mujtaba M Chaudry
(74) *Attorney, Agent, or Firm* — Eversheds Sutherland (US) LLP

(57) ABSTRACT

A method in a packet-based network like the Internet is provided, which is directed towards packet loss recovery for transmission of a data stream, $DS_0$ in a packet-based network. The method comprises transmitting data packets associated with the data stream, and upon receiving a retransmission request of missing data, retransmitting the missing data applying a selective retransmission of missing data, which may be based on a priority ranking of data types to be retransmitted, performing retransmission if it is determined that missing data will be received in time for display, or performing retransmission with a rate control.

19 Claims, 7 Drawing Sheets

(51) Int. Cl.
  *H04L 1/1867* (2023.01)
  *H04L 43/0829* (2022.01)
  *H04L 43/0852* (2022.01)

(56) References Cited

U.S. PATENT DOCUMENTS

| | | | | |
|---|---|---|---|---|
| 8,185,792 | B2* | 5/2012 | Suneya | H04N 21/4425 |
| | | | | 714/748 |
| 8,706,907 | B2* | 4/2014 | Katis | H04L 65/752 |
| | | | | 709/240 |
| 9,490,850 | B1* | 11/2016 | Paniconi | H03M 13/353 |
| 2002/0004838 | A1* | 1/2002 | Hakenberg | H04N 21/26216 |
| | | | | 709/231 |
| 2003/0235196 | A1* | 12/2003 | Balachandran | H04L 47/10 |
| | | | | 370/392 |
| 2005/0238016 | A1* | 10/2005 | Nishibayashi | H04L 49/9094 |
| | | | | 370/389 |
| 2007/0076708 | A1 | 4/2007 | Kolakowski et al. | |
| 2008/0045219 | A1* | 2/2008 | Terry | H04W 36/02 |
| | | | | 455/436 |
| 2009/0178087 | A1* | 7/2009 | Menn | H04N 21/443 |
| | | | | 725/86 |
| 2012/0300663 | A1* | 11/2012 | Lu | H04L 1/1671 |
| | | | | 370/252 |
| 2013/0003579 | A1* | 1/2013 | Lu | H04N 21/234327 |
| | | | | 370/252 |
| 2014/0254351 | A1* | 9/2014 | Newman | H04L 1/1809 |
| | | | | 370/228 |

* cited by examiner

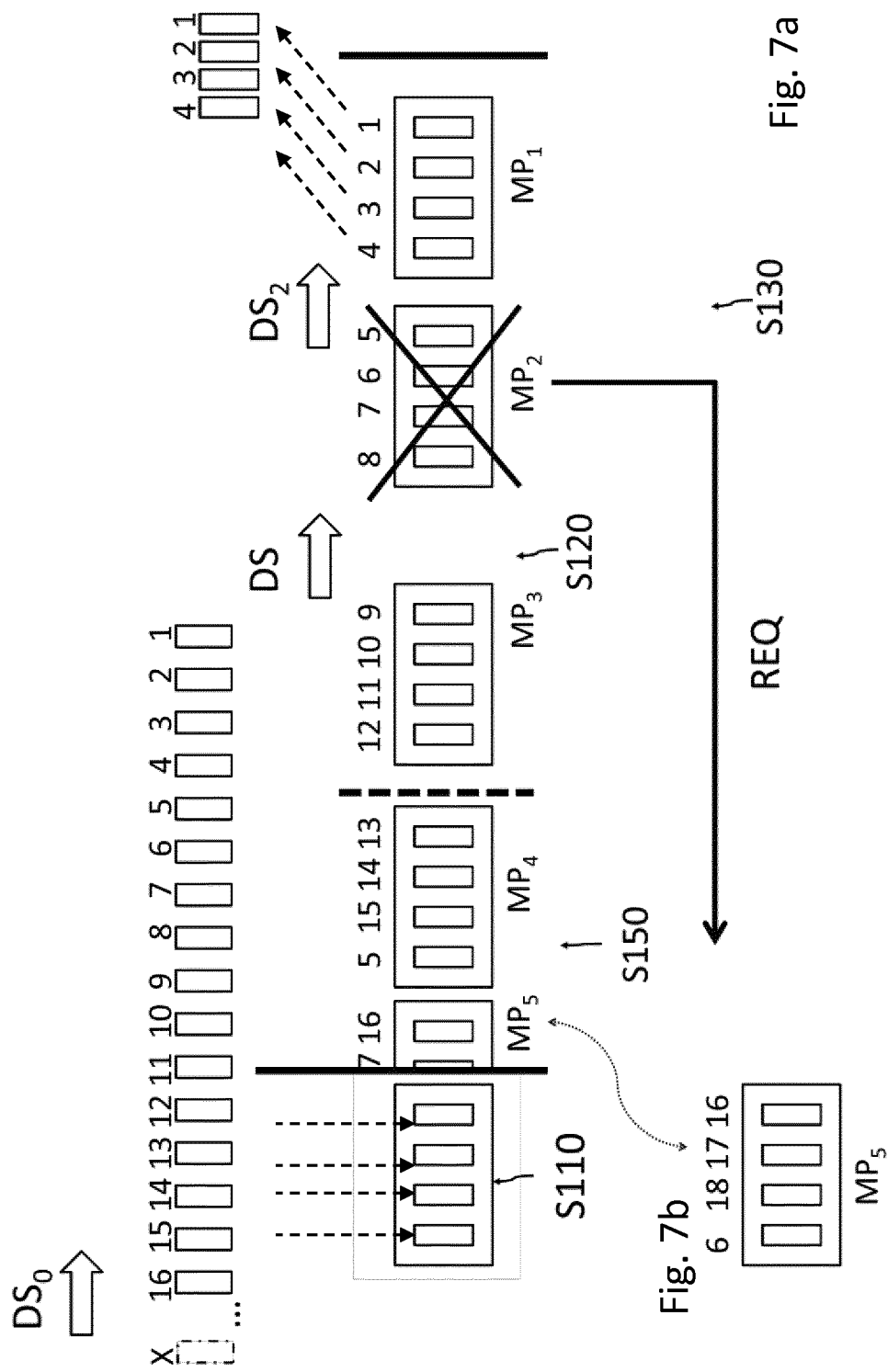

RETRANSMISSION OF DATA IN PACKET NETWORKS

FIELD OF THE INVENTION

The present invention relates to broadcasting and media distribution over IP (Internet Protocol) networks, and more particularly to packet loss recovery for transmission of a data stream in a packet-based network.

BACKGROUND OF THE INVENTION

In media distribution over an IP network, such as video and TV distribution over the Internet, the bandwidth to a client device might vary depending on different circumstances. Today, variation in bandwidth as conceived by the client device is typically handled by three mechanisms: congestion control mechanisms of TCP (Transmission Control Protocol of the TCP/IP protocol stack), buffering, and adjusting the video quality (ABR). Basically, congestion control is handled by the TCP protocol stack which adjusts the retransmission rate of lost packets to adapt the client device to use a fair share of the available bandwidth in the network (or actually in the bottleneck of the transmission). In such system, the client device needs to buffer data because it is not certain that the network can offer the bandwidth required by the video stream, and for video the client device needs to have video data to present to maintain viewer experience. So buffering is needed to absorb variances in bitrate introduced by the network and specifically by the TCP congestion avoidance mechanisms and the jitter introduced by the network. As the capacity and jitter vary in the IP network, the receiving client device pauses the presentation of a current video on the screen to accumulate more video data in its buffer. The accumulation is one way, meaning that the delay will increase and never decrease for a specific session. Such adjustments introduce delay and the video cannot be considered as a live distribution.

UDP (user datagram protocol) is an alternative to TCP (Transmission Control Protocol) that sends datagrams over an IP network. To escape the limitation of TCP in maintaining the bitrate in case of variations in quality by using congestion control mechanisms, an alternative is to use UDP and retransmission of data without congestion control. As media streams can accept small data losses but not long delays in the transport, and while TCP is not concerned with delay but needs all data to arrive at the destination, an alternative solution for media streaming is to use UDP with a retransmission technique adapted to the difference in requirements of media streams as compared with data transport. Such a retransmission technique helps the video streams to be transferred through the network while not backing off in the case of congestion. Because of that, this type of retransmission strategy needs to be done with care to avoid that other traffic on the network suffers while at the same time protecting the video streams. For example, in a situation where the receiver detects a lot of lost packets and requests retransmission of the lost packets, and when the actual BW available for the receiver has decreased because of more devices sharing the same bandwidth, bad connectivity to base station or hotspot or network congestions, the requests for retransmission of lost packets will temporarily consume more capacity and therefore worsen the situation. In view of the above, there is thus a need for mechanisms to handle retransmissions within media distribution over an IP network in an intelligent way.

SUMMARY OF THE INVENTION

It would be advantageous to at least provide an improved and reliable method of retransmission which prevents congestion in the network and which is suitable for live distribution of media content, such as TV/video/audio streams, in an IP network like the Internet. This object is achieved by a method according to the present invention as defined in claim 1.

Thus, in a first aspect of the present inventive concept, a method for providing packet loss recovery for transmission of a data stream in a packet-based network comprising transmitting data packets associated with the data stream, and upon receiving a retransmission request of missing data retransmitting the missing data. The method is characterized in that the method further comprises applying selective retransmission of missing data. When transporting live video there is a deadline when the data needs to be presented to the display/screen. This means that there is a limited time to do retransmissions stipulated by the Round Trip Time (RTT). Also, if the available bit rate for the transport of the video decreases near or below the bit rate of the video stream and packets i.e. being lost, resending all packets might worsen the situation since the already limited bandwidth will be consumed by retransmission. In such case, it is beneficial to decide what data to retransmit so as not to overload and still get the best viewer experience given the current situation. According to an embodiment of the disclosed method this is done by applying selective retransmission where the amount of data transmitted between the server and the client is advantageously reduced/adapted with respect to the network capacity. The adaption is not done as with TCP by delaying and reducing the data bit rate but by selectively retransmitting data with higher importance. The selective retransmission is adaptable such that when the capacity of the network (or client device) e.g. decreases, the limited network resources for retransmitting data are considered and only selected data is retransmitted, thereby limiting the load on the network. The selective retransmission is done in such a way that part of the media stream which is more important has priority to be retransmitted. For example, audio is most important, secondly full pictures (I-frames), delta pictures, etc. Retransmission can also be determined based on delay. If the retransmission of the data will probably not arrive before the time to present the data on the display that data will not be retransmitted.

The decision when selective retransmission is applied and to what extent (or which algorithm) is based on at least one or a combination of packet loss, jitter, bit rate measurements, coverage by Wi-Fi or mobile network, number of devices sharing same resources and other performance characteristics related to the network performance.

According to an embodiment of the method, the selective retransmission is based on a priority ranking of data types to be retransmitted, which is advantageous for resending only the most important data or only required data.

According to an embodiment of the method, the data types comprise at least one of audio data, complete video image data, and delta changes of image data.

According to an embodiment of the method, the selective retransmission comprises at least one of performing retransmission if it is determined that missing fragments will be received within a predetermined time period, e.g. received in time for display, and performing retransmission with a rate control.

According to an embodiment of the method, retransmission of multiple requests for the same packet is performed with a priority ranking, e.g. where fragments being retransmitted for the second time are prioritized over those being retransmitted a the first time, and where fragments being requested for the third, or more times, are not retransmitted at all.

According to an embodiment of the method, it further comprises monitoring characteristics of the network. Since the video stream normally goes from server to device, the device will be able to gather most of the characteristics used for making a decision regarding applying selective retransmission. The decision can however be done either in the device to distribute processing and save capacity in sending requests for retransmission, or in the edge server system which have a more complete view of the system since it has information from many devices. In the device, transport characteristics such as packet loss, jitter, bit rate and also provide information about signal strengths in case of connected to Wi-Fi or mobile data network can be monitored. Each device can also provide information about to which access point or base station it is connected for the server to make coordinated decisions for several devices. For example, if the server sees that several devices connected to the same base station experience packet loss, it can assume that the shared capacity of the base station is not sufficient for the current devices and might only selectively serve the retransmission requests received.

Selective retransmission as described herein is applicable for data packets as well as for data packets that have been fragmented and packed into macro-packets, as will explained in more detail below. The same advantages as described herein for selective retransmission of missing data packets apply for selective retransmission of fragments.

According to an aspect of the inventive concept, there is provided a method for providing packet loss recovery for transmission of a data stream in a packet-based network comprising dividing each data packet of the data stream into a preselected number of fragments, and generating macro-packets in which the fragments of the data packet are distributed, transmitting the macro-packets, and upon receiving a retransmission request of missing fragments of a data packet, distributing the missing fragments into currently generated macro packets, and retransmitting the missing fragments. The missing fragments for retransmission are thus interleaved into and distributed by currently generated traffic. The originally generated macro-packet in which the missing fragments were first transmitted is not resent, but instead any missing fragments are spread out, interleaved, in new macro-packets, which advantageously decreases the risk of losing all the missing fragments again. The size of the macro-packet may be set by a maximum transport packet size defined by the transporting network. A typical maximum size is 1500 Mbyte including fragments of different packets and overhead. The method is especially advantageous for real-time multimedia communication. Consider for instance streaming of media data such as video or audio, as compared with normal data transfers such as file transfers. In the first case, all data does not need to be transferred to the receiver. Since video is sensitive to delay, it is not possible under certain circumstances to wait for lost data to be resent. If the data has not arrived before the time for it to be presented at the display or screen, it is useless. Also, the quality of the video or audio being presented is highly dependent on the amount of data received to reconstruct the audio or video at the client side. The method according to the present inventive concept advantageously reduces the loss of data while still not violating the delay constraints needed for the media data to arrive.

According to an embodiment of the method, the generated macro-packets comprise fragments from multiple data packets. The generated macro-packets may contain fragments from a number of data packets, and optionally one or more fragments for which retransmission has been requested.

According to an embodiment of the method, it further comprises adding FEC fragments for the missing fragments. The FEC fragments are preferably distributed into macro-packets in the same manner as missing fragments for retransmission. Advantageously, if a macro-packet containing a retransmitted fragment is dropped, the macro-packet can be reconstructed by means of corresponding FEC fragments, and an additional retransmission of missing fragments may be avoided.

According to an embodiment of the method, the macro-packets are UDP packets, and the transmitting is done using a UDP mode.

According to an aspect of the invention, there is provided a node in a distribution network comprising means for performing a method according to the present inventive concept.

According to an aspect of the invention, there is provided a software module adapted to perform a method according to the present inventive concept, when executed by a computer processor, which advantageously provides a simple implementation and scalability of the solution.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node.

Further objectives of, features of, and advantages with, the present invention will become apparent when studying the following detailed disclosure, the drawings and the appended claims. Those skilled in the art realize that different features of the present invention can be combined to create embodiments other than those described in the following.

DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 7a and 7b are schematic block diagrams illustrating an embodiment of the inventive concept.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
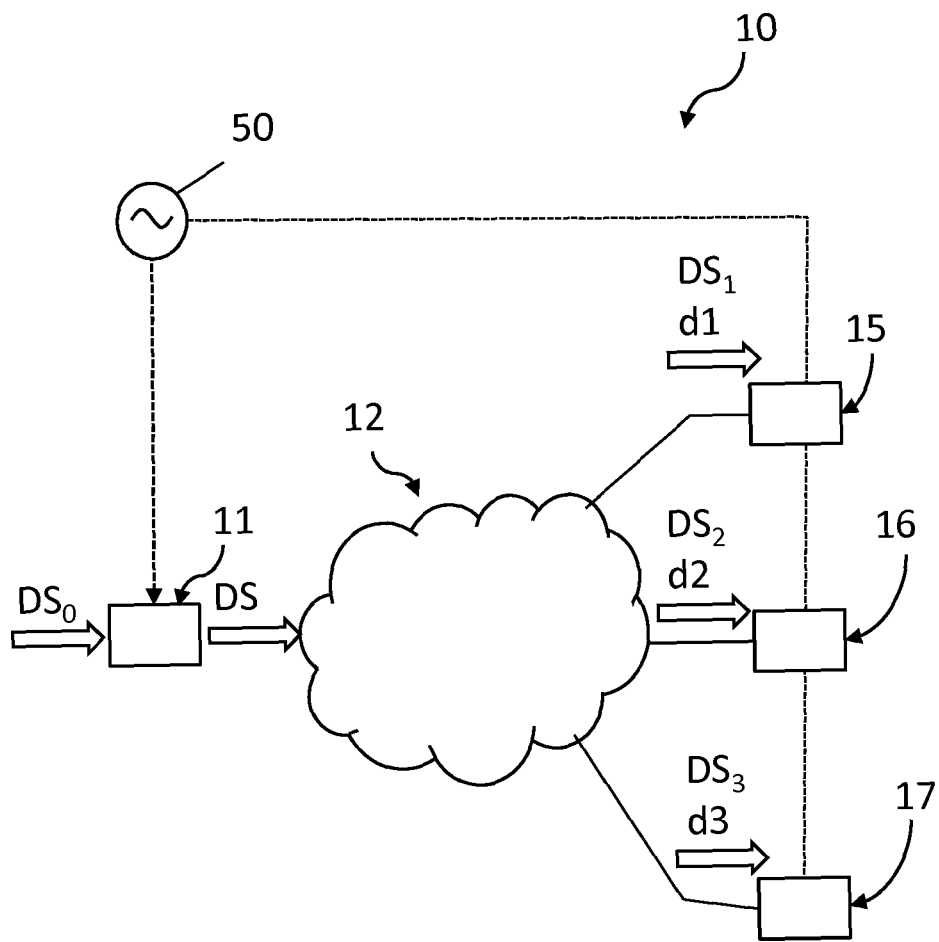
FIG. 1 is a schematic block diagram illustrating a distribution system in which embodiments according to the present inventive concept may be employed.

FIG. 1 is a block diagram schematically illustrating a distribution network system 10 of IP type for live distribution of e.g. video, in view of which aspects of the inventive concept will be described. The distribution system 10 includes a server 11 (a source) and one or more recipients or client devices 15, 16, 17 coupled by a respective communication link over a network 12. In the distribution network system 10 data transmission of a data stream $DS_0$, from the server 11 to one or more of the client devices 15, 16, 17 over the network 12 comprises steps according to embodiments of the present invention. The data transmission may involve transmitting e.g. video content or other media content in the form of video packets (multi cast video packets). In order to handle missing packets and other types of errors, communication and distribution systems employ various techniques to handle erroneously received information. The client device may correct the erroneously received information amongst other techniques by retransmission techniques, which enable the erroneously received information to be retransmitted to the receiver, for example, by using automatic retransmission request (ARQ) or forward error correction (FEC) techniques. FEC techniques include, for example, convolutional or block coding of the data prior to modulation. FEC coding involves representing a certain number of data bits or blocks of data using a certain (greater) number of code bits or code blocks, thereby adding redundancy which permits correction of certain errors.

If there are lost packets during data transmission, any client(s) experiencing missing packets will request retransmission of the lost packets from the server 11. In addition to retransmission if there is FEC information available, the clients can either attempt to recover lost packets by FEC correction and then by retransmission, or first by retransmission and then by FEC correction on the newly transmitted data.

The communication link may be a computer network (e.g. a LAN a WAN, the Internet), a wireless network (e.g. a cellular data network), or some combination of these network types.

Figure 2:
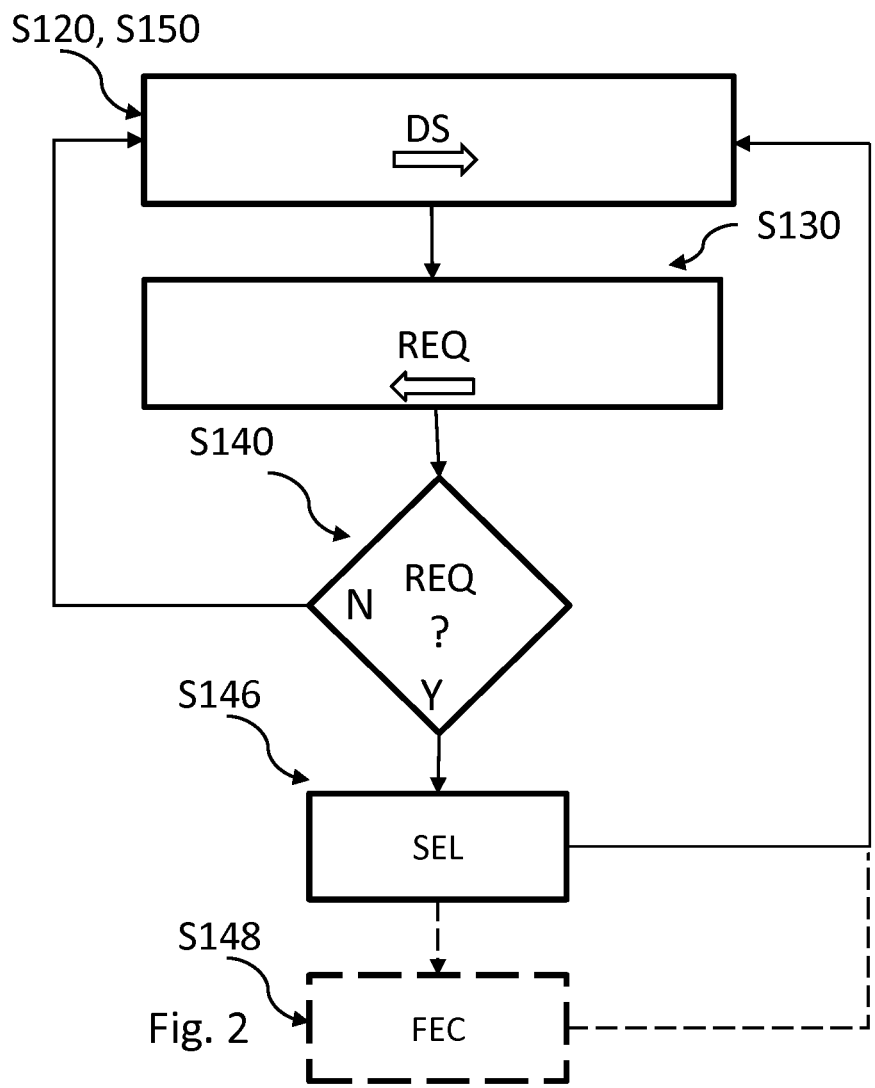
FIG. 2 is a flowchart illustrating an embodiment of a method according to the present inventive concept.
Figure 3:
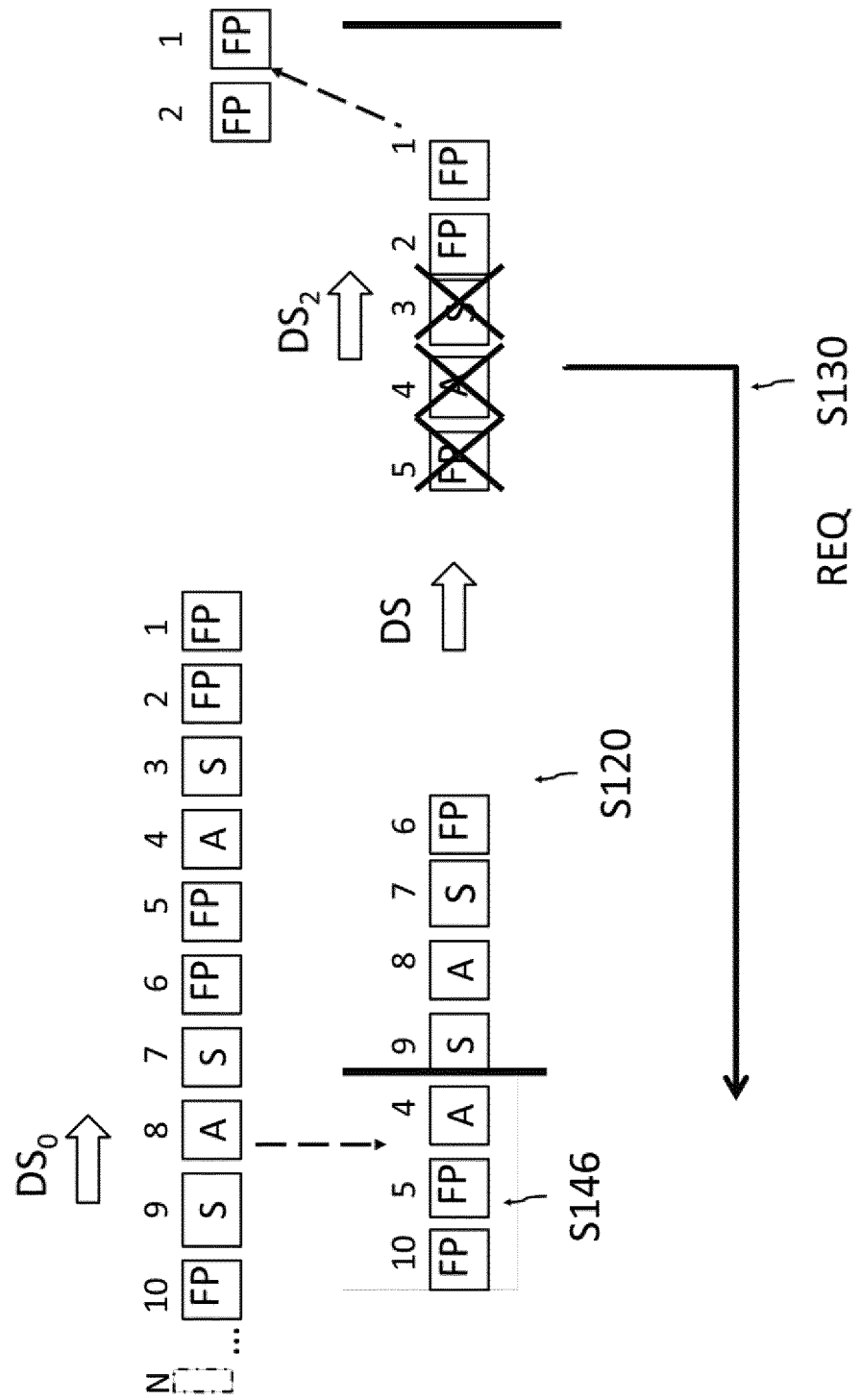
FIG. 3 is a schematic block diagram illustrating an embodiment of the inventive concept.

A flowchart illustrating steps of an embodiment of a method for providing packet loss recovery for transmission of a data stream $DS_0$ in a packet-based network is presented in FIG. 2 and described with further reference to FIGS. 1 and 3. For illustrative purposes, the data stream for transmission $DS_0$ is represented as a sequence of data packets of a contiguous stream of data, with each data packet comprising a set of payload information corresponding to a specific data type.

According to a simplified exemplifying embodiment as described below with reference to FIG. 3, the data types comprise at least one of audio data (A), complete video image/full picture data (FP), and delta changes of images data (S). In a first step (step S120, see FIGS. 2 and 3), data packets of data stream $DS_0$ are transmitted as data stream DS to a client device, e.g. client device 16. The server 11 is arranged to continuously monitor if retransmission requests of missing data of an already transmitted data packet is received from the client device (step S130). If a retransmission request REQ of missing data (or a data packet) is received (step S140), selective retransmission is applied to the missing data (S145). The selective retransmission mechanism may be applied at the client device 16, where based on a current traffic situation, available resources, or capacity of the client, selective retransmission requests are made. For instance, if the client device determine that the quality of its connection with the server is one of excellent, sufficient or poor (e.g. via 4G or via a low quality Wi-Fi signal), it requests retransmission of all or only part of the missing data, respectively.

Alternatively, the selective retransmission is determined based on information at the server 11. Since the server 11 is typically connected to multiple client devices, and other nodes of the network, decisions of the selective retransmission may be determined on a network level.

The missing data accepted for selective retransmission is interleaved in the outgoing data stream DS (step S150), and thus retransmitted to the client device.

In an optional step S148 (additional step with dashed lines in FIG. 2), the method further comprises adding FEC packets for the missing data. The FEC packets are preferably distributed into the outgoing data stream DS in the same manner as missing data for retransmission. Advantageously, if a recent data packet is dropped, the data packet can be reconstructed by means of corresponding FEC packets, and additional retransmission of the missing data packet may be avoided.

The retransmission distribution of missing data may be arranged according to a preselected distribution scheme where the requested data is distributed e.g. in every $n^{th}$ transmitted packet (performing retransmission with a rate control), or not retransmitted governed by time limitations. For instance, when the data stream is part of a live broadcast such as live TV distribution, retransmission of missing data may be down prioritized if the expected arrival time at the client is too late for playout. The selective retransmission is according to embodiments based on a priority ranking of data types to be retransmitted, or priority ranking based on number of retransmissions of certain data etc.

In an exemplifying embodiment as illustrated in FIG. 3, the method as described with reference to FIG. 2 will now be visualized starting with a data stream $DS_0$ for transmission which comprises a number of subsequent packets 1-N (each illustrated as a rectangle). Considering the data stream to be an MPEG transport stream MPEG-TS, retransmission in the IP network is typically performed on an application level or at the MPEG-TS level utilizing a user-defined-retransmission scheme. In this simplified illustration each packet represents 188 bytes of MPEG packets which each contains audio samples (A), different types of reference pictures/frames (e.g. Instantaneous Decoding Refresh, IDR, frames or I-frames, B-frames) indicated as full picture data (FP) and inter frame data (B-frames, P-frames) here indicated as sub picture data (S). IDR frames are typically larger than an MPEG packet and are thus transported in multiple consecutive MPEG packets. In a packet header, the type of data contained in the corresponding packet (and coming packets) is identified. For MPEG packets containing IDR frames, the first header identifies that IDR data is coming in consecutive packets, followed by e.g. packets (each) containing a number of audio samples etc., each packet having a given sequence number. As illustrated in FIG. 3, at the sending side, subsequent data packets with sequence numbers 1, 2, 3, 4, . . . 9, 10 . . . N of the data stream $DS_0$ is transmitted as data stream DS (S120) which at the client side is received as data stream $DS_2$. At reception of the data stream $DS_2$, it is determined that data packets with sequence numbers 3-5 are missing and the client device in this example then sends a request REQ for all missing data packets 3-5 (S130) to the sending side. Based on the request REQ and, according to embodiments of the method, on additional information regarding the current state of the network, e.g. if the client device is connected to 4G or Wi-Fi, selective retransmission is applied. In the illustration selective retransmission based on data type prioritization is utilized. The priority order is selected from highest to lowest priority in the following order: audio data A, full picture data FP, and sub picture data S. To limit the load on the network, here only full picture data FP and audio data A (i.e. data packets 4 and 5) are retransmitted. The missing packets 4 and 5 are interleaved in the currently transmitted data stream DS (S146).

Figure 4:
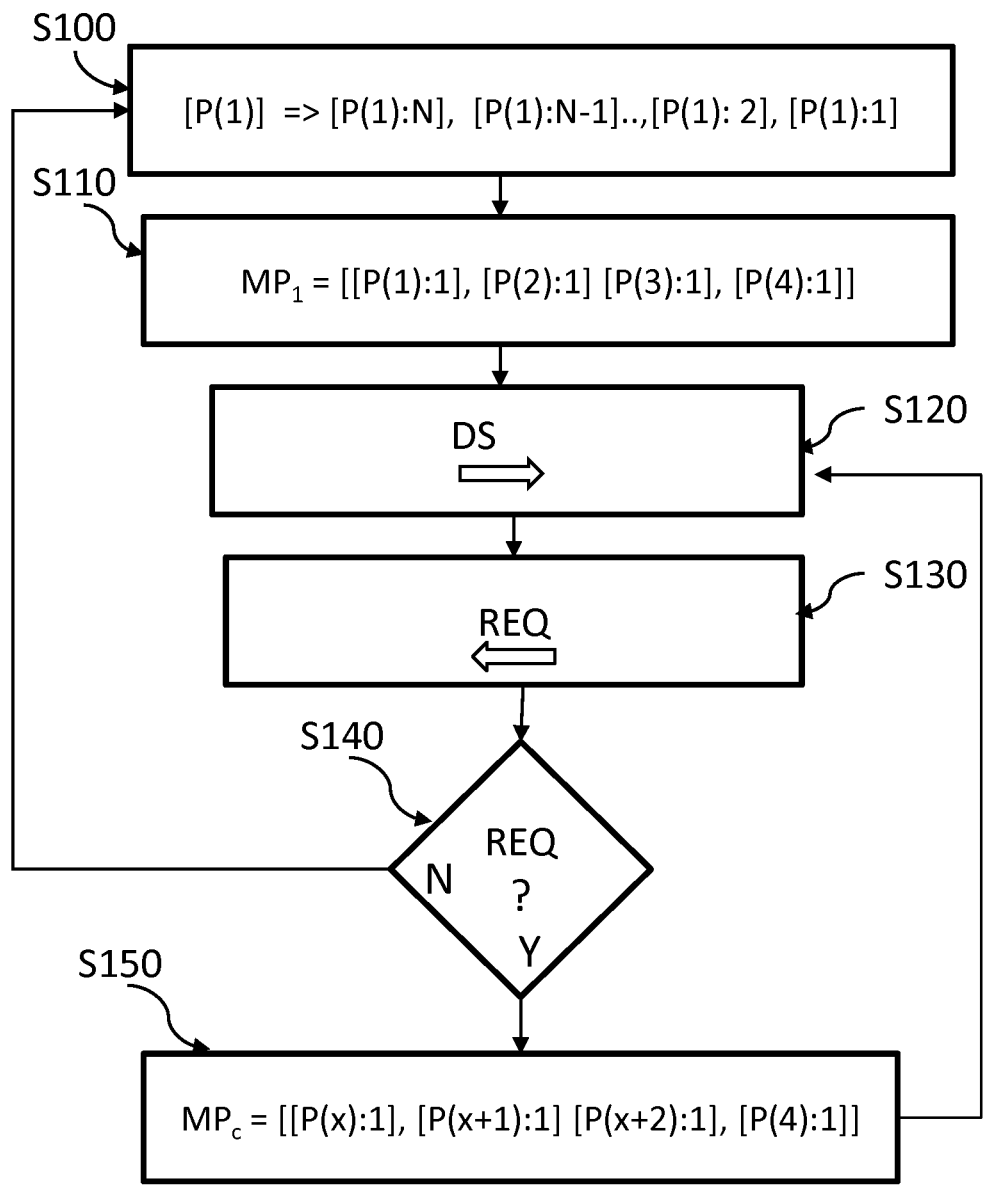
FIGS. 4 to 6 are flowcharts illustrating embodiments of a method according to the present inventive concept.

Continuing now with reference to FIG. 1 and to FIG. 4, which is a flowchart illustrating steps in an embodiment of a method for providing packet loss recovery for transmission of a data stream $DS_0$ in a packet-based network according to the present inventive concept. For illustrative purposes, the data stream for transmission $DS_0$ is represented as a sequence of data packets representing a contiguous stream of information, with each data packet comprising a set of payload information representative of a segment of the stream of information corresponding thereto. In the exemplifying embodiments subsequent packets are denoted as [P(X+1)], [P(X)], . . . , [P(2)], [P(1)], the number of segments for dividing the packets N is selected to be 4, and the size of macro-packets and size of the data packets are selected to be the same. Preferably, the size of the macro-packets and the size of the data packets are selected as close as possible to the maximum size of an Ethernet packet (which is 1518 or 1522 bytes). In the case of using MPEG-TS mapping, the fragments are MPEG-TS packets which have a size of 188 bytes (or if the optional trailer is used 208 bytes) meaning that there is 7 fragments in an IP/Ethernet packet. The invention is not limited to MPEG-TS code stream. Any digital media flow may be protected using the invented algorithm such as MPEG-TS on RTP or directly on RTP. The selected number of segments N and the size of the macro-packets are application dependent and preferably selected depending on the data transmission standard used in the distribution.

Before transmission of the data stream from the server 11, the information payload of each data packet is divided into N fragments (step S100). The fragments are normally constructed in an encoder or a transcoder. Each fragment has a header identifying what type of data the fragment has, etc. Packet [P(1)] is thus divided into [P(1):4], [P(1):3], [P(1): 2], [P(1):1]. Next, macro-packets $MP_n$ are generated in which fragments of a predetermined number of packets are distributed (step S110), when a macro-packet is filled with fragments it is inserted in data stream DS for transmission to the clients (step S120). The server 11 is arranged to continuously monitor if retransmission requests of missing fragments of an already transmitted data packet is received from a client (step S130). If a retransmission request REQ of missing fragments of a data packet are received (step S140), the missing fragments (here fragment [P(4):1]) are distributed into currently generated macro-packets MPc (step S150) which is packed with fragments associated with different subsequent fragmented packets originating from the data stream $DS_0$, and then retransmitted in the new macro-packet MPc (step S120). The retransmission distribution of fragments may be arranged according to a preselected distribution scheme where the requested fragments are distributed e.g. in every $n^{th}$ macro-packet, or not retransmitted governed by time limitations. For instance, when the data stream is part of a live broadcast such as live TV distribution, retransmission of a missing fragment may be down prioritized if the expected arrival time at the client is too late for playout.

According to an embodiment of the invention, the generated macro-packets comprise subsequent fragments originating from one or more subsequent data packets of the data stream $DS_0$ (or alternatively subsequent fragments of a continuous data stream). Thus, more than one fragment originating from different data packets may be transported in the same macro-packet, and the originating data packets need not be directly subsequent to each other (especially when retransmitting fragments). The packing order in the macro-packets is typically governed by a predetermined packing algorithm. In an exemplifying embodiment as illustrated in FIG. 7a, the method as described with reference to FIG. 4 will now be visualized starting with a data stream $DS_0$ for transmission which comprises a number of subsequent fragments 1-X (each illustrated as a rectangle). At the sending side, subsequent fragments 1, 2, 3, 4, . . . 11, 12 of the data stream $DS_0$ are packed into macro-packets MP1, MP2, MP3, each containing four fragments (N=4, S110). The macro-packets MP1, MP2, MP3 are transmitted as data stream DS which at the client side is received as data stream $DS_2$ (S120). At reception of the data stream $DS_2$, it is determined that the macro-packet MP2 is missing and the client device sends a request REQ for the missing packet MP2 (S130) to the sending side. Based on the request, the fragments 5, 6, 7, and 8 of the missing packet MP2 are then interleaved in the currently generated macro-packets MP4, MP5, MP6, and $MP_7$ (of which MP6 and $MP_7$ are not shown in FIG. 7a), respectively. $MP_5$ is illustrated as being currently generated in FIG. 7a. A close up picture of $MP_5$ in FIG. 7b reveals that the missing fragment 6 is added at the end of the macro-packet. The distribution scheme is here selected to add missing fragments at the end of a sequence of currently generated macro-packet MPH. The generated macro-packets are then transmitted in the data stream DS (S120).

Figure 5:
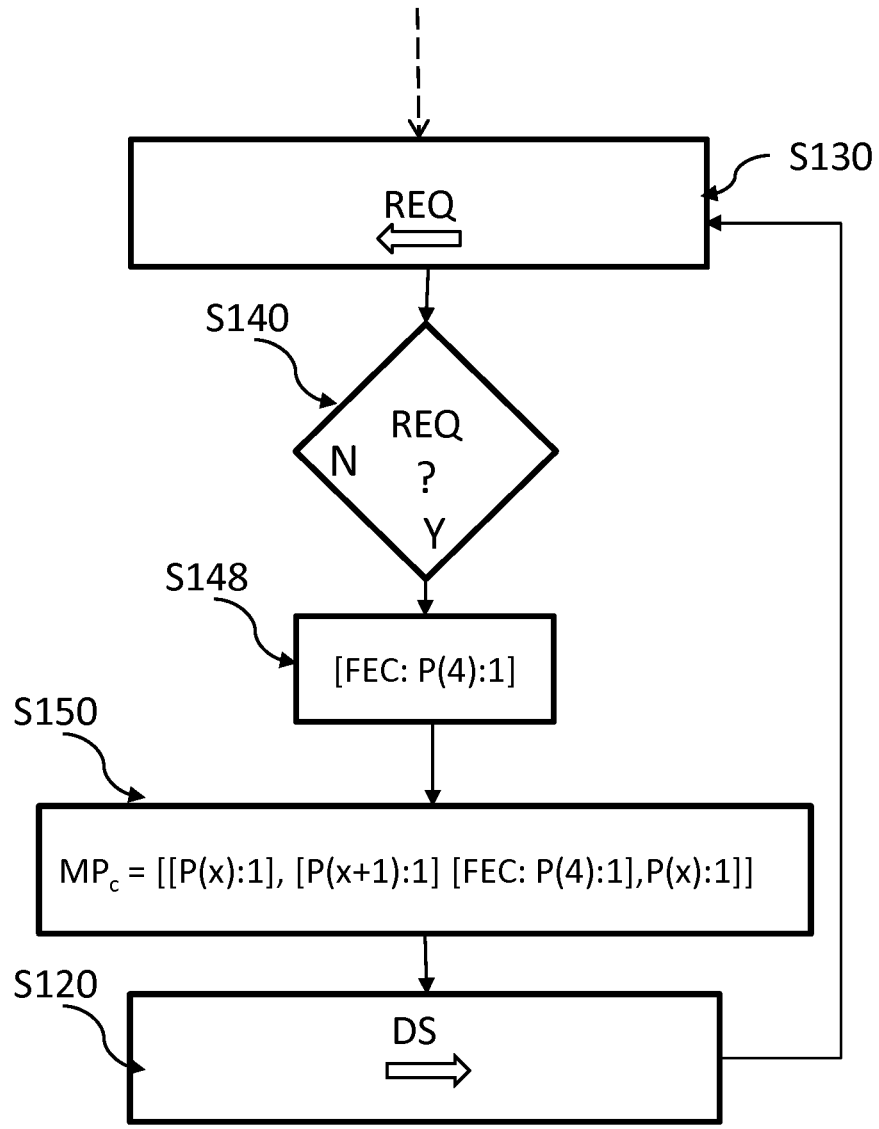

Referring now to FIG. 5, according to an embodiment of the method, which has essentially the same steps 100-150 as described above with reference to FIG. 4, in an additional step (step 148), FEC fragments are provided for the requested missing fragments ([FEC:P(4):1]] in the example shown in FIG. 5) and packed into generated macro-packets. Typically, FEC is calculated for a group of fragments to be resent. One or more FEC fragments are generated and interleaved in different currently generated macro-packets in the same manner as the other fragments to be resent. The added FEC fragments for the missing fragments are thus typically sent in separate macro-packets such that if the originally missing fragment is lost once more in transmission, reconstruction of the missing fragments can be provided by means of the FEC fragment.

Traffic overhead may be defined as the ratio between retransmission network traffic incurred at the server by retransmission and error recovery and the normal network traffic incurred by delivering of the media data, e.g. video.

If the recovery of lost packets induces 10% additional network traffic the traffic overhead is thus 0.1. The available network bandwidth is finite and the network is thus sensitive to a too big traffic overhead.

Figure 6:
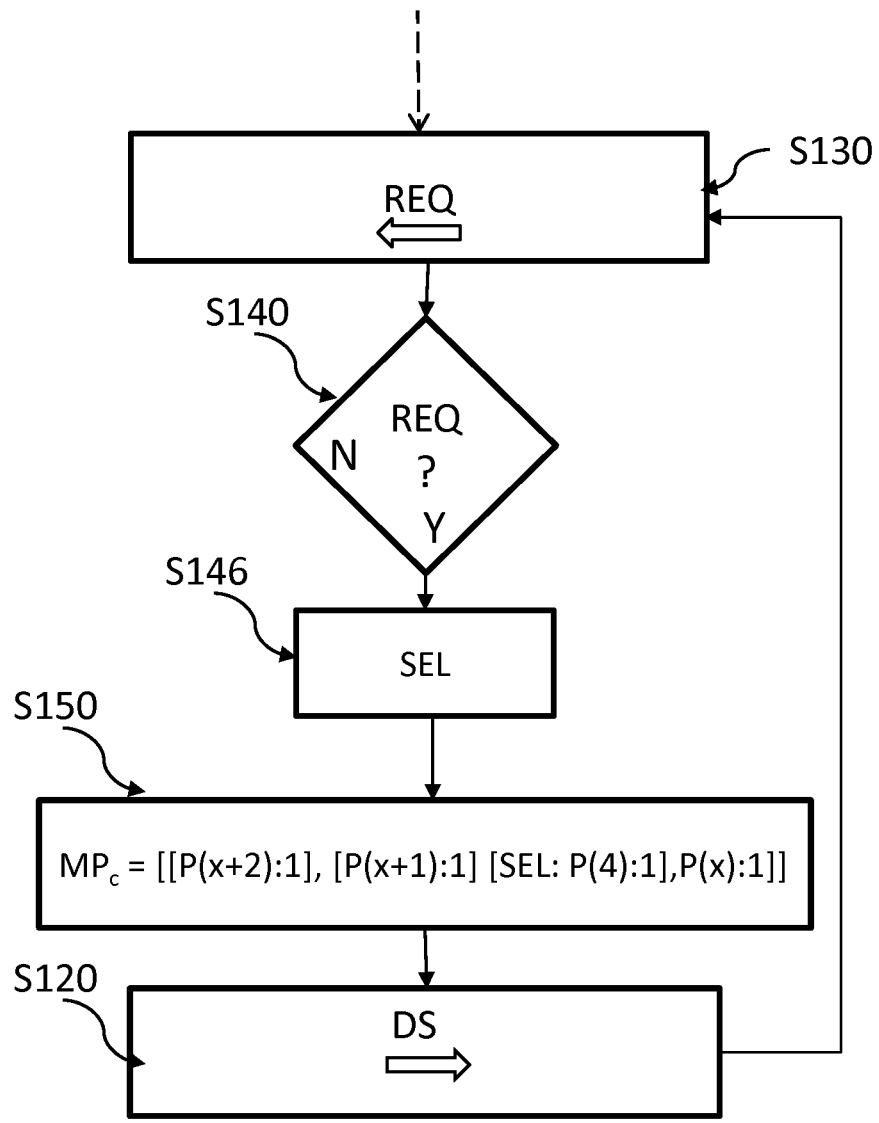

As previously mentioned, according to embodiments of the method, a step of providing selective retransmission of missing data packets or fragments is applied in the method. In FIG. 6, a step for providing selective retransmission SEL of fragments (step 146) is illustrated. The selective retransmission is according to an embodiment based on a priority ranking of data types to be retransmitted. The data types between which prioritization can be applied may be, with different prioritization ranking, at least one of audio data, complete video image data, and delta changes of images data. The reason for doing this is that the viewer is most sensitive to audio disturbances. Also, since the delta changes of pictures relates to the full picture, a lost full picture makes the delta changes useless. When the network capacity is decreasing, fragments corresponding to missing audio data may be selected to be retransmitted with normal retransmission rate, while fragments related to delta changes of images are down prioritized, optionally on the client device viewers own choice, not to compromise the transmission success rate of the audio of the video.

Video data is a continuous-media that must be presented at a predetermined playout rate meaning that data not arriving in time for being presented at the screen or display is useless. Therefore, the time frame for requesting and/or retransmission of missing packets or packets which have not yet arrived due to network delay is finite.

According to an embodiment of the method, the selective retransmission comprises at least one of performing retransmission if it is determined that missing fragments will be received within a predetermined time period, and performing retransmission with a rate control. In the first case the method may comprise a step of determining/predicting if the missing fragment is expected to reach the receiver in time for replay/playout or some other processing step, and then simply cancel retransmission of a fragment that is determined not to reach the client device in time for play out. The second option will retransmit missing data packets or fragments according to a preselected rate. According to an embodiment, rate control is provided by prioritizing which fragments are being retransmitted. If for example the round trip time is slightly higher than the time for two retransmissions, the strategy is to prioritize retransmission of the fragments that are being retransmitted a second time over the ones being retransmitted a first time because they have less time than the ones being retransmitted the first time but can still make it in time. Segments being requested to be retransmitted a third time will not be retransmitted at all.

When and in which manner selective retransmission is to be applied in the method, is according to an embodiment of the method determined by monitoring characteristics of the network. Quality of Service, QoS, transmission capacity or delay in the network are suitable characteristics upon which the selective retransmission and/or priority ranking is activated. Preselected, or selectable, threshold values of the characteristics are applied to choose different retransmission strategies. The characteristics of the loss of data in a network might differ between different network types. For example, if the access to the network is based on fiber to the home the losses are typically sporadic and sharing of resources between different users are low meaning that in that case only severe losses shall impose aggressive selective retransmission. If the device is connected via mobile data network such as 3G, 4G or LTE, the characteristics of the losses and delays can depend on whether the resources are shared with other users in the same mobile cell or that the device has entered an area with bad reception. This means that the retransmission strategy needs to be more careful not using the limited network resources for retransmitting data, thereby increasing the network load.

The invention claimed is:
1. A method for providing packet loss recovery for transmission of a data stream in a packet-based network comprising:
   transmitting data packets associated with said data stream; and
   upon receiving a retransmission request of missing data, the missing data comprising data of a first data type and a second data type:
   determining a first priority level of the first data type that is to be retransmitted;
   determining a second priority level of the second data type that is to be retransmitted;
   applying a selective retransmission of missing data based on a priority ranking of the first priority level and the second priority level; and
   retransmitting a first portion of the missing data at a first rate, and a second portion of the missing data at a second rate, wherein the second rate is less than the first rate, wherein the first portion of the missing data is of the first data type, and the second portion of the missing data is of the second data type;
   wherein said first rate is based on a number of times the first portion has been retransmitted being greater than the number of times the second portion has been retransmitted.

2. A method according to claim 1, wherein said selective retransmission comprises at least one of performing retransmission if it is determined that the first portion of the missing data will be received within a predetermined time period, and performing retransmission with a rate control.

3. A method according to claim 1, further comprising monitoring characteristics of the network comprising at least one of quality of service, QoS, transmission capacity or delay of the network, and wherein said selective retransmission is activated based on said monitored characteristics.

4. A method according to claim 1, wherein said transmitting of data packets comprises:
   dividing each data packet of said data stream into a preselected number of fragments;
   generating macro-packets in which said fragments of said data packet are distributed; and
   transmitting said macro-packets.

5. A method according to claim 4, wherein said missing data corresponds to at least one missing fragment, and wherein said retransmitting of said missing data comprises:
   distributing said missing fragments into currently generated macro-packets, and retransmitting said missing fragments.

6. A method according to claim 4, wherein said generated macro-packets comprise fragments from multiple data packets.

7. A method according to claim 1, further comprising adding FEC fragments for said missing data.

8. A method according to claim 1, wherein said data types comprise at least one of audio data, complete video image data, and delta changes of image data.

9. A method according to claim 8, wherein audio data is prioritized over video image data.

10. A software module adapted to perform a method according to claim 1 when executed by a computer processor.

11. A device comprising:
memory that stores computer-executable instructions; and
at least one processor configured to access the memory and execute the computer-executable instructions to provide packet loss recovery for transmission of a data stream in a packet-based network by:
transmitting data packets associated with said data stream; and
upon receiving a retransmission request of missing data, the missing data comprising data of a first data type and a second data type:
determining a first priority level of the first data type that is to be retransmitted;
applying a selective retransmission of missing data based on priority ranking of the first priority level and the second priority level; and
retransmitting a first portion of the missing data at a first rate, and a second portion of the missing data at a second rate, wherein the second rate is less than the first rate, wherein the first portion of the missing data is of the first data type, and the second portion of the missing data is of the second data type;
wherein said first rate is based on a number of times the portion has been retransmitted being greater than the number of times the second portion has been retransmitted.

12. The device of claim 11, wherein said selective retransmission comprises at least one of performing retransmission of it is determined that the first portion of the missing data will be received within a predetermined time period, and performing retransmission with a rate control.

13. The device of claim 11, wherein the at least one processor is further configured to access the memory and execute the computer-executable instructions to:
monitor characteristics of the network comprising at least one of quality of service, QoS, transmission capacity or delay of the network, and wherein said selective retransmission is activated based on said monitored characteristics.

14. The device of claim 11, wherein said transmitting of data packets comprises:
dividing each data packet of said data stream into a preselected number of fragments;
generated macro-packets in which said fragments of said data packet are distributed; and
transmitting said macro-packets.

15. The device of claim 14, wherein said generated macro-packets comprise fragments from multiple data packets.

16. The device of claim 14, wherein said missing data corresponds to at least one missing fragment, and wherein said retransmitting of said missing data comprises:
distributing said missing fragments into currently generated macro-packets, and retransmitting said missing fragments.

17. The device of claim 11, wherein the at least one processor is further configured to access the memory and execute the computer-executable instructions to:
add FEC fragments for said missing data.

18. The device of claim 11, wherein said data types comprise at least one of audio data, complete video image data, and delta changes of image data.

19. The device of claim 18, wherein audio data is prioritized over video image data.

* * * * *